C. A. WERDEN.
HORSE HAY RAKE.
No. 249,811. Patented Nov. 22, 1881.
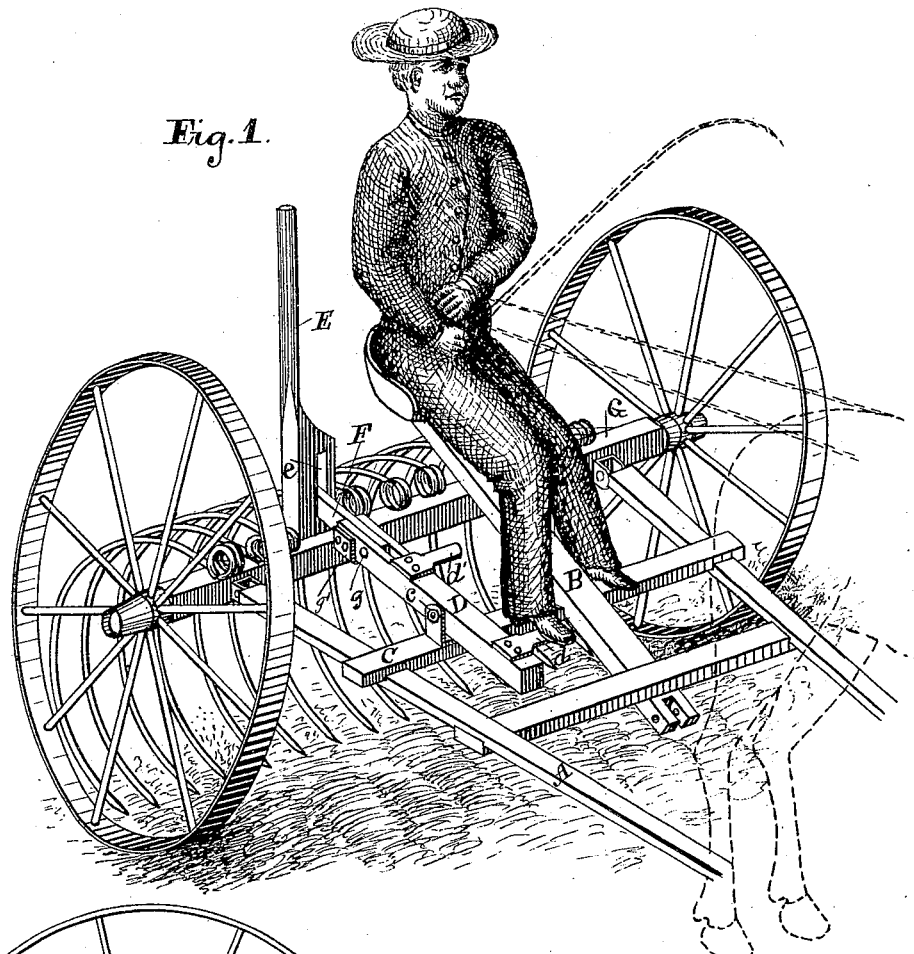
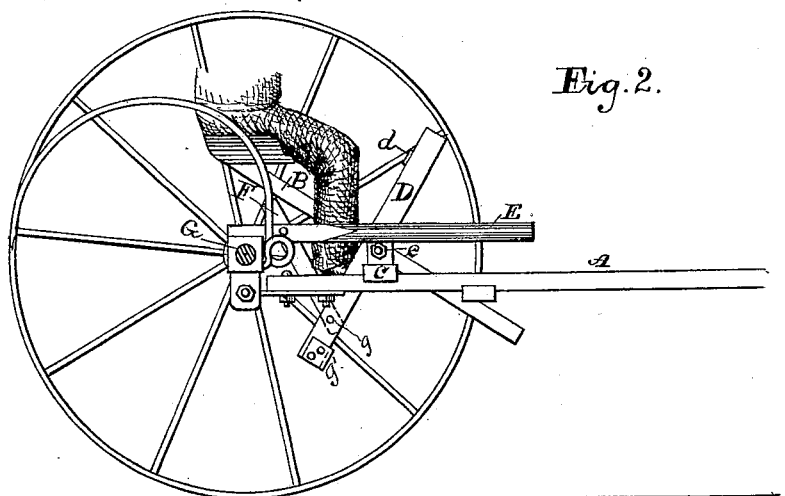
Witnesses:
Edwin G. Asmus
E. H. Bottum
Inventor:
Cyrus A. Werden
per S. S. Stout
Attorney

UNITED STATES PATENT OFFICE.

CYRUS A. WERDEN, OF WAUKEGAN, ILLINOIS, ASSIGNOR TO HIMSELF, WILLIAM B. WERDEN, FRANCIS H. WERDEN, AND CLINTON A. WERDEN, ALL OF SAME PLACE.

HORSE HAY-RAKE.

SPECIFICATION forming part of Letters Patent No. 249,811, dated November 22, 1881.

Application filed September 1, 1879.

*To all whom it may concern:*

Be it known that I, CYRUS A. WERDEN, a citizen of the United States, residing at Waukegan, in the county of Lake and State of Illinois, have invented certain new and useful Improvements in Horse Hay-Rakes; and I hereby declare the following to be a full, clear, and exact description thereof, reference being had to the accompanying drawings, of which—

Figure 1 is a perspective view of my improved device, showing the rake down; and Fig. 2, an end elevation of the same, with the nearer wheel removed, showing the rake up.

The object of my invention is so to construct a horse hay-rake that the dumping of a windrow, by throwing up the rake after the manner usual in devices for this purpose, and, also, the returning of the rake to the vicinity of the ground, shall be effected wholly by the foot of the driver and by his weight, without any aid whatever from his hands, the said dumping being accomplished (after the breaking of a toggle-joint by a slight pressure of the foot) wholly and solely by the weight of the driver upon the seat, and the said returning of the rake being accomplished wholly by the foot of the driver through his exertion therewith upon a lever of sufficient pressure to raise himself, together with the seat, and thus straighten the toggle-joint.

My object is, further, to provide means whereby the rake may be elevated slightly without dumping, for the purpose of clearing stones and other like obstructions and readily returned to its proper position.

To these ends my invention consists, first, in hinging the thills (which carry the driver's seat) to the face of the axle (which carries the rake-teeth) about midway between the upper and lower edges of said axle, and combining with these parts a pair of toggle-levers adapted to trip downward; and it consists, secondly, in providing the axle of the device comprising the parts aforesaid with a hand-lever, whereby the rake may be slightly tilted to clear obstructions, but at the same be restrained from dumping, all as hereinafter more fully set forth.

A particular description of my device, referring to the drawings, is as follows:

A represents the thills, which are hinged in any suitable manner to the face of the axle about midway between the upper and lower edges thereof.

B is the seat-bar, which is supported by a bar, C, passing across from one thill to the other. The bar C also forms the fulcrum for the foot-lever D, which is pivoted to it at $c$, and extends for a considerable distance beyond it.

Projecting up from the rake head or axle G is a stirrup, $e$, to which one end of a toggle-lever, F, is pivoted, the other end of said lever being pivoted in the foot-lever D at $g$, said foot-lever having a suitable stirrup or stop, $g'$, below the lever F and behind the pivotal point of the same, to prevent the toggle from tripping upward. Of course the effect would be the same if the stop were above the lever F, but in front of the pivotal point. The foot-lever D is provided with pedal-projections $d$ $d'$, placed, respectively, in front of and behind the fulcrum.

The operation of this part of my device is as follows: After the driver has taken his seat and placed his foot upon the pedal-projection $d$ the rake will be held firmly against the draft on the hay, for all strain will then be against the dead-center; but when it is desired to deposit a windrow it is only necessary to remove the foot to the projection $d'$, where a slight pressure will destroy the dead-center and allow the weight of the driver, acting upon the front of the axle, to revolve it so as to raise the forks and release the load. This accomplished, a slight pressure of the foot upon the projection $d$ suffices to throw the rakes into position again.

Heretofore horse hay-rakes have been made with the thills hinged to the lower edge of the axle and with a system of toggle-levers similar to mine. With such an arrangement, however, the dumping cannot possibly be performed by the weight of the driver alone, (the hinging of the thills to the face of the axle being an essential feature for the accomplishment of this end,) but has to be assisted by a hand-lever. Others have been made with the thills hinged to the face of the axle, but with a system of toggle-levers wholly different from mine, being adapted to trip upward instead of downward, and to be operated by the hand instead of the foot of the driver. Such an arrangement as the latter is obviously a very imperfect and inconvenient one.

The precise combination of parts shown in my device, by means of which I accomplish results which have never heretofore been accomplished, has never before existed.

A second and subordinate feature of my invention lies in providing the axle with a hand-lever, E, rigidly attached to it and extending upward far enough to be within convenient reach of the driver. This hand-lever has nothing whatever to do with dumping the windrows or returning the rakes to position, all that being performed by the parts already described. When, however, obstructions are to be cleared the driver, by taking hold of the hand-lever and depressing the projection d', may revolve the axle sufficiently to avoid the obstruction, and may then carry the rake back into position without losing any hay or increasing the draft of the horses. The hand-lever may be conveniently formed by prolonging the stirrup e, as shown in the drawings.

What I claim as new, and desire to secure by Letters Patent, is—

1. In combination with the axle G and forks of a horse hay-rake, the thills A, hinged to the face of said axle between the upper and lower edges thereof, driver's seat supported by the said thills, cross-bar C on said thills, foot-lever D, pivoted to a stirrup on the said cross-bar and projecting forward beyond the same, toggle-lever F, pivoted at one end to a stirrup, e, on the axle, and at the other to the foot-lever D, and a suitable stop, g, on the said foot-lever to adapt the toggle to trip downward only, substantially as shown and described.

2. In combination with the axle G and forks of a horse hay-rake, thills A, pivoted to the face of said axle between the upper and lower edges thereof, driver's seat supported on said thills, and toggle-levers D F, connecting the axle and thills, and constructed as described, whereby they are adapted to trip downward only and to be operated by the foot of the driver, the hand-lever E, projecting upward from the axle and rigidly secured to the same, substantially as and for the purpose set forth.

In testimony that I claim the foregoing I have hereunto set my hand this 19th day of August, 1879.

CYRUS A. WERDEN.

Witnesses:
STANLEY S. STOUT,
LEOPOLD HAMMEL.